(No Model.) 4 Sheets—Sheet 1.
T. C. HARGRAVE.
MACHINE FOR MAKING SEWER PIPE.
No. 450,583. Patented Apr. 14, 1891.
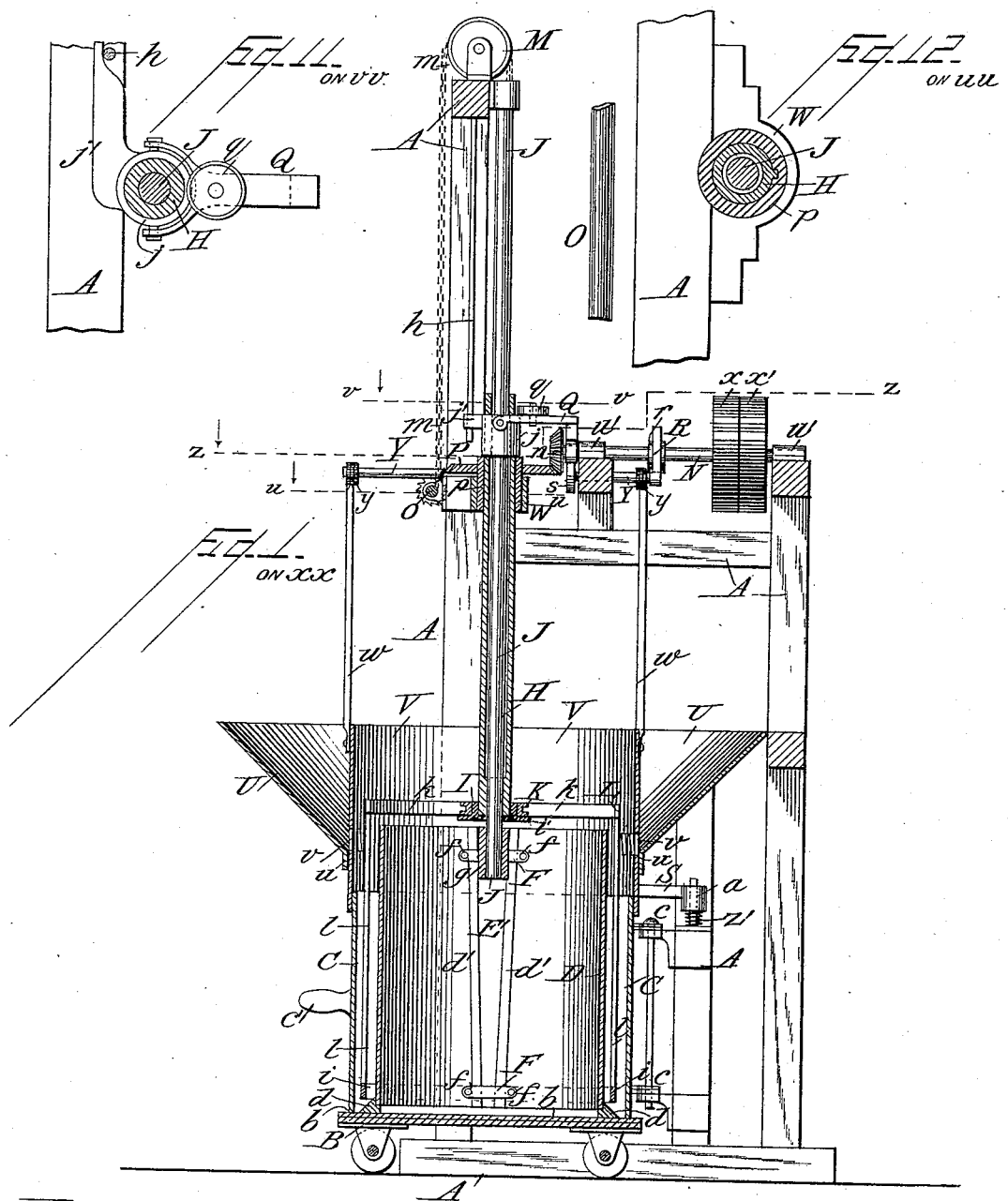
Attest:
F. H. Schott
M. Georgii
Inventor
Thomas C. Hargrave
By E. B. Clark
Atty (No Model.) 4 Sheets—Sheet 2.
T. C. HARGRAVE.
MACHINE FOR MAKING SEWER PIPE.
No. 450,583. Patented Apr. 14, 1891.
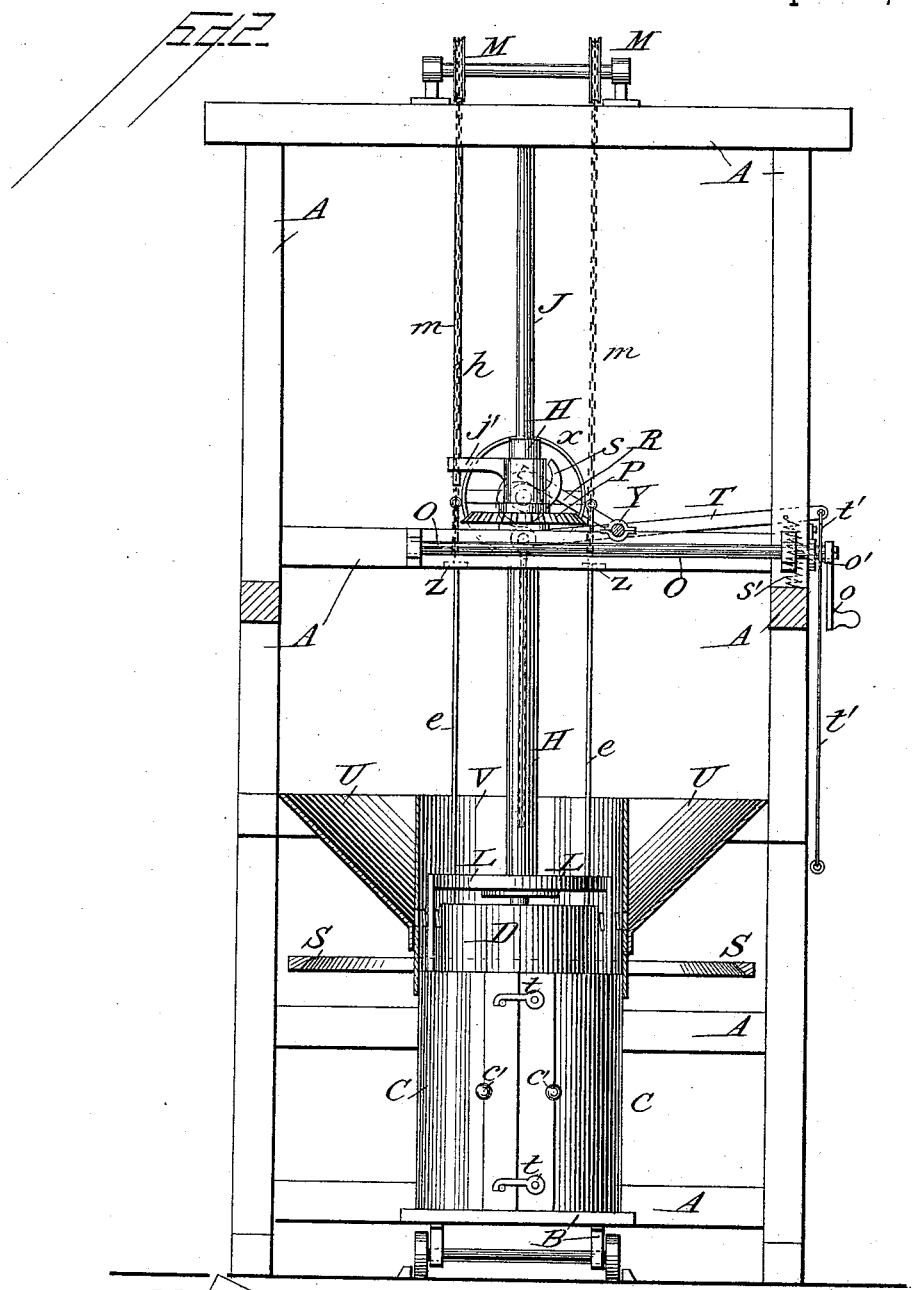
Attest:
F. H. Schott
M. Gergu
Inventor
Thomas C. Hargrave
By E. B. Clark
atty

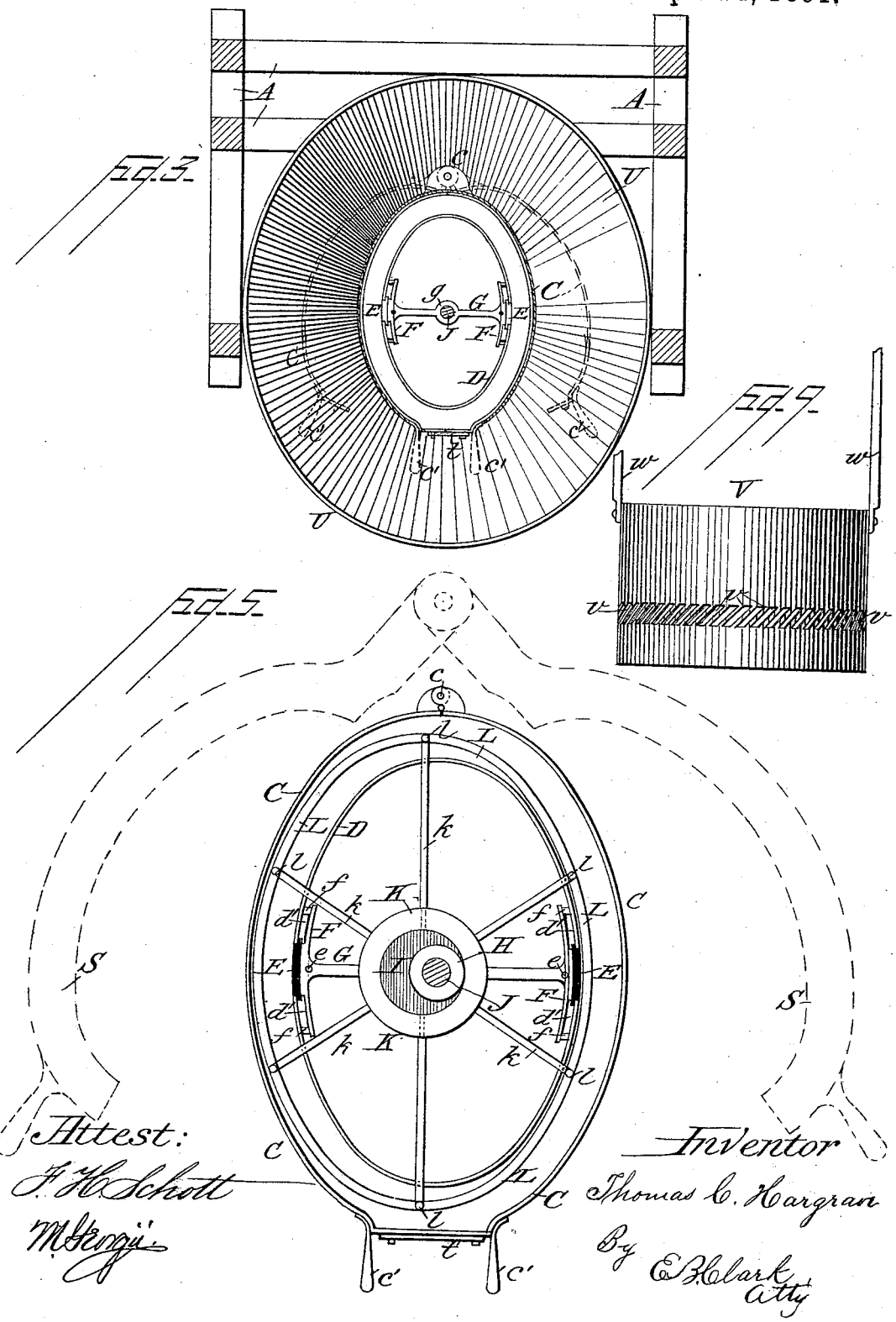

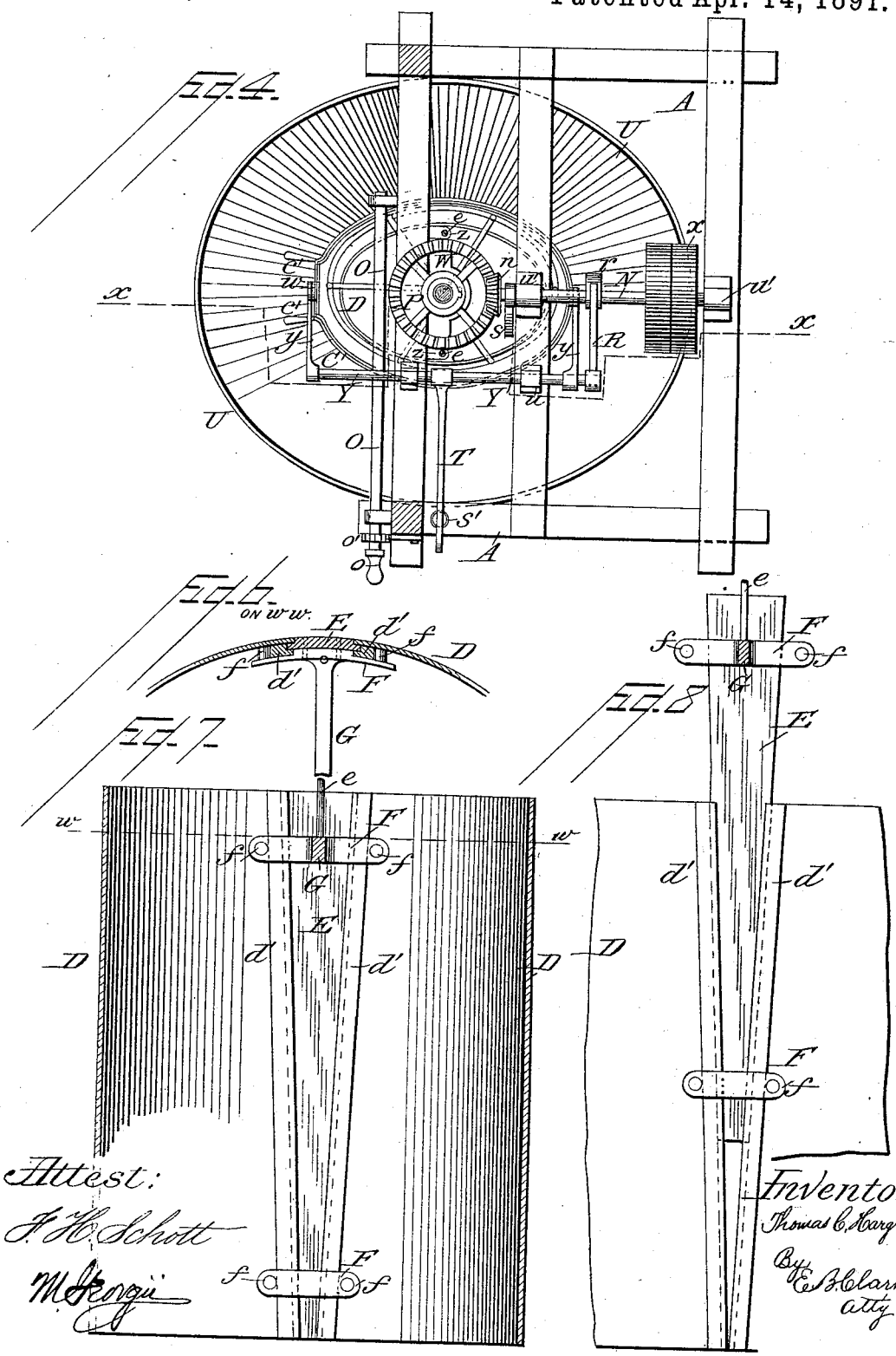

UNITED STATES PATENT OFFICE.

THOMAS C. HARGRAVE, OF MINNEAPOLIS, ASSIGNOR TO THE MINNESOTA PATENT SEWER PIPE COMPANY, OF HENNEPIN COUNTY, MINNESOTA.

MACHINE FOR MAKING SEWER-PIPE.

SPECIFICATION forming part of Letters Patent No. 450,583, dated April 14, 1891.

Application filed April 19, 1890. Serial No. 348,928. (No model.)

*To all whom it may concern:*

Be it known that I, THOMAS C. HARGRAVE, a citizen of the United States, residing at Minneapolis, in the county of Hennepin and State of Minnesota, have invented certain new and useful Improvements in Machines for Making Sewer-Pipe; and I do hereby declare the following to be a full, clear, and exact description of the invention, such as will enable others skilled in the art to which it appertains to make and use the same.

This invention relates to a machine for making sewer-pipe of a mixture of cement and sand or fine gravel, or of other suitable plastic material.

The objects of my invention are, first, to provide for making sewer-pipe which is elliptical in cross-section, and therefore better adapted to stand the vertical strain or downward pressure to which large pipes are subjected; second, to provide for regularly and uniformly feeding the material into the mold around its entire circumference; third, to provide for uniformly and thoroughly tamping the material in the elliptical mold; fourth, to provide for readily lifting the core and removing the finished pipe from the mold.

The matter constituting my invention will be defined in the claims.

I will now particularly describe the construction and operation of my improved machine by reference to the accompanying drawings, in which—

Figure 1 represents a vertical section of the machine on line $x$ $x$, Fig. 4, with parts in elevation, the section being taken through the greatest diameter of the elliptical mold. Fig. 2 represents an end elevation of the mold and operating mechanism with parts in section. Fig. 3 represents a top plan view of the mold and its feed-hopper. Fig. 4 represents a top plan view of the mold, feed-hopper, and the operating mechanism with the central shaft in section, on the line $z$ $z$, Fig. 1. Fig. 5 represents a top plan view of the mold and the tamping or ramming device on an enlarged scale. Fig. 6 represents a horizontal section on the line $w$ $w$, Fig. 7, through one side of the core. Fig. 7 represents a vertical section showing the inside of the core. Fig. 8 represents a sectional detail showing one of the wedge-pieces partially removed from the core. Fig. 9 represents a side elevation of the slotted elliptical feed-casing which works inside of the feed-hopper. Fig. 10 represents a detail view, on an enlarged scale, of the rock-shaft and levers for operating the feed-casing. Fig. 11 represents a sectional detail view, on an enlarged scale, on line $v$ $v$, Fig. 1, of the lifting-lever and shaft for the tamping device. Fig. 12 represents a sectional detail view, on an enlarged scale, on line $u$ $u$, Fig. 1.

Like letters of reference designate the same parts in different figures of the drawings.

The mold and its operating mechanism are arranged and supported in a fixed frame A, and the mold C and its core D, when lowered, are supported upon a truck B, which is adapted, when pushed into place within the fixed frame A, as shown in Fig. 1, to close the mold at its bottom, and is preferably provided with mold-board $b$, when it is desired to provide the lower end of the pipe with a rabbet or joint. The mold-board $b$ is provided with a former $d$, corresponding to the contour of the end of the pipe to be molded, and upon such former rests the lower end of the core D.

The casing or shell of the mold C joins the mold-board outside of the former, as shown. This casing is divided vertically into two parts, which are mounted in and movable on the fixed frame A, and preferably joined together at the back by hinges $c$, Figs. 1 and 3, fastened to the said frame A. The parts of the casing C are provided at their front edges with handles $c'$ and latches $t$ for holding them together.

The core D is preferably elliptical in cross-section, and is also made in two longitudinal sections, the edges of which are somewhat tapered from bottom to top, as shown in Figs. 7 and 8, and are joined together by clamps and wedge-pieces, as described below. The adjacent edges of the sections are provided on the inside with inclined strips $d'$, which may be cast upon or otherwise secured to such sections, and such strips are provided with longitudinal grooves for receiving tongues of the longitudinal wedge-piece E, as shown in Figs. 6 and 7. To the wedge-piece E are secured near its ends the clamping-bars F F, which are provided with projections, preferably in the shape of lugs or pins $f\,f$, which overlap and embrace the strips $d'\,d'$, as shown in Figs. 6 and 7. The wedge-shaped pieces E E on each side of the core are connected to the cross-bar G, provided centrally with the long hub $g$, Figs. 1, 3, and 5, which slides freely on a fixed upright guide-shaft J, as shown in Fig. 1. This shaft J is secured at the top to frame A and serves to support and guide centrally both the core and the tamping device. To the ends of the cross-bar G, adjacent to the wedge-pieces E, are attached two rods $e\,e$, Figs. 2 and 7, which extend upward and pass through guides $z\,z$, attached to the frame A, as shown in Figs. 2 and 4. These rods are connected with chains $m\,m$, Fig. 2, which pass over the pulleys M M, mounted on top of the frame A, and then pass down and are fastened to the shaft O, mounted in suitable bearings secured to the cross-frame A, as shown in Figs. 2 and 4. This shaft is provided with a handle $o$ and ratchet-wheel $o'$, with the latter of which connects a pawl and serves for winding the chain when it is desired to raise the wedge-shaped pieces of the core, as hereinafter more fully described.

The tamping device or rammer and its operating mechanism will now be described. Upon the fixed vertical guide-shaft J is placed the reciprocating sleeve-shaft H, provided with operating-gearing at its upper end and connecting with the tamping device at its lower end. To the lower end of the sleeve-shaft H is secured an eccentric I, Figs. 1 and 5, and to the periphery of such eccentric is connected the head K of the tamping device, the parts being so connected that the eccentric will work freely in the head. The head K is in the nature of a collar resting on a flange $i'$ of the eccentric I, provided with radial arms $k\,k$, connecting at their outer ends with the elliptical or annular frame or band L, and also to the vertical rods $l\,l$. These rods connect at their lower ends with the elliptical band or frame $i$, as shown in Fig. 1. The band L at the top of the tamping device may be omitted, if desired, and the radial arms connected simply to the rods $l$. By means of the eccentric I the tamping-bars and band are caused to shift horizontally and travel over the entire area of the elliptical space within the mold, so that the material shall be evenly and uniformly tamped down. In order to give vertical reciprocating motion to the tamping device the sleeve-shaft H is provided at its upper end with a sliding box $j$, arranged to slide freely upon such shaft. To the box $j$ is pivotally attached the forked lever Q, Figs. 1 and 11, having affixed to its upper side the friction-wheel $q$, in such position that it will readily bind upon the shaft H when the free end of the lever Q is raised. The sliding box $j$ is also provided with a rigid wing $j'$, which at its outer end bears against the vertical rod $h$, attached to the frame A and serving to prevent such box from turning with shaft H.

Below box $j$ the beveled spur-wheel P, having a hollow hub $p$, is mounted in a box W. The hub $p$ engages with the hollow shaft H by means of a feather, forming a spline-joint, so that such shaft is free to slide through the hub, but will rotate therewith. The hub rotates freely in the box W, which is secured to the cross-frame A, as shown in Figs. 4 and 12. The beveled gear P meshes with and receives motion from the pinion $n$, secured to the shaft N. This shaft N is mounted in suitable bearings $u'\,u'$ on the frame A, and is provided with fast and loose pulleys $x\,x'$, also with the cam $r$ for operating the slotted feed-casing, and with cam $s$ for giving reciprocating motion to sleeve-shaft H. The slotted and reciprocating feed-casing and its operating mechanism will now be described.

The preferably flaring feed-hopper U is constructed in the form of an elliptical cone or conoid or in any other form corresponding with the shape of the mold-casing, and is provided at its bottom with a short extension $u$. Within the hopper U is arranged the reciprocating casing V, which extends down through the extension $u$ and around the casing C of the mold, as shown in Figs. 1 and 2. This casing is also elliptical, and is provided a little below its middle portion with the inclined slots $v$, extending around its entire circumference. The slots $v$ are arranged in casing V, so as to be at the bottom of hopper U, and are for feeding the material from the hopper into the mold all around its circumference. To the casing V are attached the vertical rods $w\,w$, which are pivotally connected at their upper ends to the lever-arms $y\,y$, secured to the rock-shaft Y, Figs. 1, 4, and 10. The rock-shaft Y is mounted in suitable bearings on frame A, and has secured to one of its ends the lever R, the outer end of which rests upon the eccentric $r$ on shaft N, and from which it receives motion. At about the middle of rock-shaft Y there is also secured a lever T, which rests at its outer end upon a coil-spring $s'$, and has connected to it the chain $t'$. (Shown in Fig. 2.) This mechanism gives vertical reciprocating motion to the feed-casing V.

Directly above and in line with the top of the mold are arranged two formers S, mounted in and adapted to move in the frame A, conforming in their sweep to the shape of the mold, and having a beveled under face corresponding to the shape which it is desired to give to the end of the pipe. They are hinged together, as indicated by dotted lines in Fig. 5, and as shown at $a$ in Fig. 1, where the hinge is attached to frame A. The hinge is preferably supported by a spiral spring, which permits vertical movement of the formers, so that when closed they may be pressed down upon the material in the mold and give the desired shape to the end of the pipe.

The operation of the machine may now be readily understood as follows: In commencing work the truck B, carrying the mold-board, is placed in position in the frame under the mold-casing. The core D is lowered upon the mold-board and properly expanded by the wedge-shaped pieces E. The parts of casing C are closed and secured by latches $t$ $t$, as shown in Figs. 2 and 3. The rammer or tamping device will now be suspended just above the bottom of the mold, as shown in Fig. 1. The hopper U being supplied with the material for forming the pipe, the driving-shaft N is started, causing the eccentric $r$ to revolve, and through the medium of lever R, rock-shaft Y, arms $y$, and rods $w$ imparts a reciprocating motion to the slotted feed-casing V. This reciprocating motion of the casing V causes the material in hopper U to sift down through the slots $v$ and fall into the mold around its entire circumference, where it is evenly and thoroughly packed by the tamping device. At each revolution of the cam $r$ the feed-casing V is raised and falls partially by its own gravity and partially by operation of the coil-spring $s'$, bearing upon the outer end of lever T, which is connected to the rock-shaft Y. A vertical reciprocating motion is imparted to the tamping device by means of cam $s$ on shaft N, which cam, as it is revolved, bears upon and raises the forked lever Q, which presses the friction-wheel $q$ against the sleeve-shaft H, thus preventing box $j$ from sliding on such shaft, and the shaft is consequently lifted by the revolving cam, thereby raising the tamping device to the height of the cam. After the passage of the cam under lever Q the sleeve-shaft and its connected tamping device fall by gravity and pack the material in the mold. At each fall of the shaft H the sliding box $j$ also falls until it comes in contact with and is arrested by the hub $p$ of gear P, while the shaft H and tamping device proceed downward until arrested by the material in the mold. As the mold is gradually filled up with the material fed into it, the shaft and tamping device gradually rise upon the fixed shaft J until the mold is full. Although the shaft and tamping device gradually advance upon shaft J, they are still given the same amount of throw or vertical fall at each revolution of cam $s$, because box $j$ slides down over sleeve-shaft H as the latter rises and is locked on any part of it by the friction-wheel $q$. The density of the packing or tamping of the material in the mold may be controlled by increasing or diminishing the weight of the tamping device. Extra weights may be supplied upon such device, if desired. It is evident that the heavier the tamping device the denser will be the packing, and vice versa.

In order that the material in the mold may be uniformly packed throughout the whole area, it is necessary that the tamping device should be continously shifted after each stroke or blow, and this is accomplished through the medium of the pinion $n$ on shaft N meshing with and turning the bevel-gear P. Each revolution of pinion $n$ turns gear P one-quarter turn, causing the eccentric I to make a quarter-turn, thereby shifting the position of the tamping device at every blow, so that the whole area of the mold space is covered by the band $i$ of the tamping device. The mold having been filled, the machine is stopped and the lever T is pulled down by rod $t'$, thus raising the casing V and exposing the top of the mold. The upper end of the pipe is now finished and given the proper form by the formers S S, which are closed upon the core D. The machine is now started and the tamping device made to deliver a number of strokes or blows upon the formers, which thereby impart the proper shape to the end of the pipe, which is thus completed.

In order to remove the finished pipe, the formers are unclasped and swung back to the position shown in dotted lines, Fig. 5. Then the shaft O is turned, thereby winding up the chains $m$ and drawing the rods $e$ and the connected cross-head G and wedge-pieces E upward onto the core D, causing the parts thereof to close together through the action of the lugs or pins $f$ upon the strips $d'$. The core is then drawn away from the inner surface of the molded pipe and is wound up by continuing to turn the shaft O and is retained in an elevated position by means of the ratchet-wheel $o'$ and its pawl. It will be noted that by my arrangement of the wedges the sections are positively forced together or apart, according as the wedges are withdrawn or inserted—that is to say, the core is positively expanded and contracted. This is due to the arrangement of the projections or pins $f$, which bear against the inclined strips $d'$ when the wedges are being drawn up, and thus forces the sections together as the wedges are withdrawn. The latch-pieces $t$ are now raised and the parts of the mold-casing C swung back upon their hinges, as shown in dotted lines, Fig. 3. The pipe is now freed from the mold and may be drawn away upon the truck to any desired place. Another truck is then placed in position in the frame and the operation of making a pipe-section is repeated.

It will be noted that all the parts of my mold and pipe-forming machine, except the truck, which serves to carry away the completed pipe and which may or may not be provided with a mold-board, are movably mounted or suspended in the fixed frame. Thus in the embodiment of the machine herein shown the casing C and the former S are made in sections hinged to the fixed frame, while the core D, the tamper L, and the casing V are suspended from the machine and adapted to be raised away from the completed pipe. This renders the manipulation of the heavy parts of the machine very simple and easy, leaving the completed pipe ready to be moved away on the truck and readily removable to the kiln or drying-room. None of the devices of which I am aware embody this advantage—that is to say, leave the pipe when completed freed from all the parts of the mold and resting upon a truck ready to be conveyed to the proper place for further treatment. It should also be noted that my tamping device comprises a continuous tamping-strip instead of mere tamping-pins, as heretofore employed. This strip enables me to perform the tamping operation far more effectively, inasmuch as a far greater area of the material to be tamped is acted upon at the same time.

My device for horizontally shifting the tamping-strip enables me to do away with the devices for turning the mold, and thereby renders the machine more simple and facilitates the use of a simple truck for carrying away the completed pipe. It is to be observed, moreover, that the annular tamping-strip $i$, being narrower than the mold, will permit the ready access of the material to be tamped into the mold from the hopper U.

In the manufacture of large and heavy pipe and where it is desirable to remove it some distance from the machine in a green state, there may be placed within the mold a sheet-iron casing, which may remain on the pipe until it is dry or set, when it may be removed and returned to the machine to be again used for the same purpose.

In the manufacture of round pipe the machine will be modified in some of its features, and some parts may be entirely dispensed with. For instance, the elliptical tamping device will be made round, and may be attached directly to the sleeve-shaft without an intervening eccentric. The eccentric, however, may still be advantageously used in the tamping device for round pipe. Of course for round pipe the mold, hopper, feed-casing, and formers will be of circular form.

If preferred, an endless belt may be employed instead of the truck B for carrying the finished pipe away from the machine; but I preferably use the truck.

The machine is quite simple in its construction and operation, and by means of it a superior quality of pipe can be rapidly manufactured.

Having now particularly described my invention, what I claim, and desire to secure by Letters Patent, is—

1. In a machine for making sewer-pipe, the combination, with a frame and a mold-casing, of a vertical guide-shaft fixed in the frame above the mold, a core suspended in the frame and having a cross-bar sliding on the vertical shaft, a tamping device also suspended in the frame, and mechanism for raising and lowering both the core and tamping device, substantially as described.

2. In a machine for making sewer-pipe, the combination, with a frame and mold-casing, of a guide-shaft fixed in the frame above the mold-casing, the suspended core and the suspended tamping device, both connected with and arranged to slide upon the fixed guide-shaft, and operating mechanism, substantially as described.

3. The combination, with a frame and mold-casing, of a central vertical guide-shaft fixed in the frame above the mold-casing, the suspended core connected with and sliding upon said guide-shaft, and means for raising and lowering the core, substantially as and for the purpose described.

4. In a machine for making pipe, a divided core having inclined strips along its adjacent edges, in combination with a longitudinally-movable wedge-shaped piece provided with projections for embracing the inclined strips, whereby when the wedge is withdrawn the projections positively contract the core, substantially as and for the purpose set forth.

5. In a machine for molding pipe, a divided core having inclined strips along its adjacent edges, in combination with longitudinally-movable wedge-shaped pieces having projections for embracing the inclined strips, and means for lifting the wedge-shaped pieces attached to said wedge-shaped pieces, whereby the core is first contracted and then lifted bodily out of the mold, substantially as described.

6. In a machine for molding pipe, a divided core having tapering edges, in combination with a longitudinal wedge-shaped piece adapted to bear upon said tapering edges for expanding the core and forming a continuous surface, and a clamping device adapted to positively contract the core and hold its parts together, substantially as described.

7. In combination with a fixed mold for making pipe, a tamper adapted to reciprocate vertically and shift horizontally, substantially as described.

8. In a machine for making pipe, the combination, with an annular mold, of a tamping device provided with an annular or elliptical tamping-strip narrower in cross-section than the mold, and means, substantially as described, for imparting a vertically-reciprocating and a horizontally-shifting motion to the tamper, substantially as and for the purposes set forth.

9. In a machine for making pipe, the combination, with a mold, of a tamping device provided with a collar, an eccentric encircled by said collar, and a shaft to which said eccentric is secured, said shaft being adapted to rotate and reciprocate vertically, substantially as described.

10. In combination with a pipe-mold, a feed-hopper and a reciprocating perforated or slotted feed-casing, substantially as described.

11. In combination with the mold and feed-hopper, a reciprocating perforated feed-casing, a rock-shaft connected by arms and rods to such casing, and a lever and cam for imparting motion to the rock-shaft and connected casing, substantially as described.

12. The combination of the mold, the shifting tamping device working in the mold and connected to a vertical reciprocating shaft, and means for rotating and reciprocating such shaft, for the purpose described.

13. The combination, with a mold and a fixed shaft arranged above it, of a revolving and reciprocating hollow shaft working on such fixed shaft, a tamping device attached to the lower end of the hollow shaft and working in the mold, and mechanism for revolving and reciprocating the hollow shaft, as and for the purpose described.

14. The combination, with a revolving and reciprocating hollow shaft carrying the tamping device and a fixed supporting-shaft, of a sliding box arranged on such hollow shaft, a forked lever pivoted to such box and having a friction-wheel for engaging with the hollow shaft, and a cam bearing upon the forked lever for raising the hollow shaft, as described.

15. The combination, with the hollow shaft and fixed supporting-shaft arranged above the mold, of a gear-wheel having a hub engaging the hollow shaft by means of a feather or spline, a sliding box on the hollow shaft, a forked lever pivoted to such box and having a friction-wheel, a stop for preventing the sliding box from turning, and a cam on the driving-shaft, all connecting and operating as described.

16. The combination, with a mold and a fixed shaft arranged above it, of a revolving and reciprocating hollow shaft working on such fixed shaft and having an eccentric secured to its lower end, the shifting tamping device connecting with such eccentric and working in the mold, and operating mechanism, as described.

17. In combination with a mold, the formers S S, attached to and movable in a fixed frame in a position to fit over the outer casing upon the molded pipe, substantially as described.

18. In combination with the mold, the formers S S, pivoted or hinged to the frame A in position to fit over the top of the outer casing C upon the molded pipe, and a spring for permitting depression of the former, as described.

19. The combination, with the frame and mold, of the formers S S, attached to and movable in the frame in position to fit over the outer casing upon the molded pipe, and the tamping device adapted to strike upon the formers for imparting the proper shape to the end of the pipe while in the mold, substantially as described.

In testimony whereof I affix my signature in presence of two witnesses.

THOMAS C. HARGRAVE.

Witnesses:
JOHN W. COBB,
EDWARD A. TIFFANY.